Figure 1:
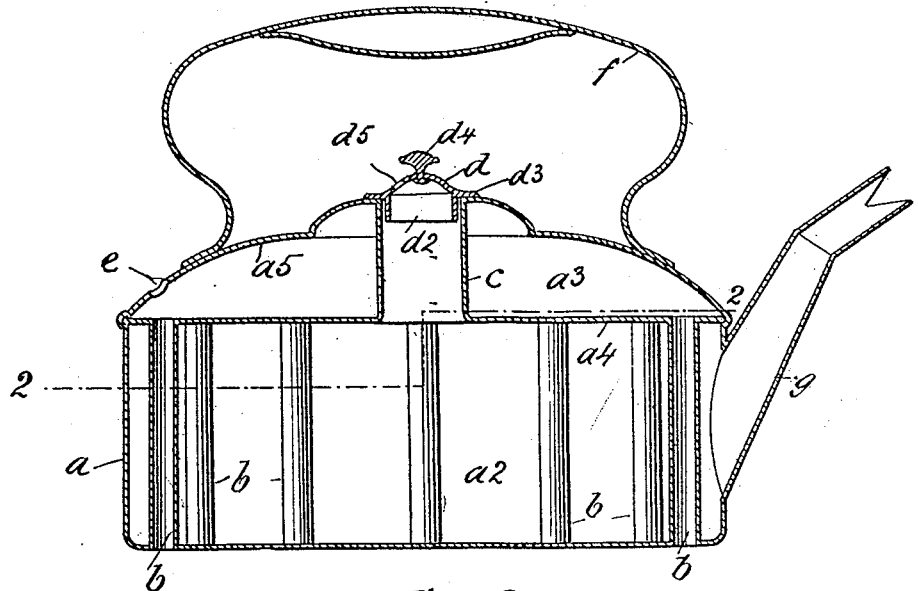

No. 845,993. PATENTED MAR. 5, 1907.
H. APPLEBY & A. A. GARDNER.
KETTLE FOR BOILING WATER.
APPLICATION FILED AUG. 27, 1906.

WITNESSES
INVENTORS
Henry Appleby,
Alfred A. Gardner.
BY Edgar Tate & Co., ATTORNEYS.

UNITED STATES PATENT OFFICE.

HENRY APPLEBY, OF LONDON, AND ALFRED ARCHER GARDNER, OF HANWELL, ENGLAND.

KETTLE FOR BOILING WATER.

No. 845,993.  Specification of Letters Patent.  Patented March 5, 1907.

Application filed August 27, 1906. Serial No. 332,093.

*To all whom it may concern:*

Be it known that we, HENRY APPLEBY and ALFRED ARCHER GARDNER, subjects of the King of Great Britain, residing, respectively, at Hammersmith, London, in the county of Middlesex, England, and Hanwell, in the county of Middlesex, England, have invented certain new and useful Improvements in Kettles for Boiling Water, of which the following is a specification, such as will enable those skilled in the art to which it appertains to make and use the same.

This invention relates to kettles for boiling water; and the object thereof is to provide an improved device of this class whereby water may be quickly and easily boiled or heated; and with this and other objects in view the invention consists in a device of the class specified, constructed as hereinafter described and claimed.

The invention is fully disclosed in the following specification, of which the accompanying drawing forms a part, in which the separate parts of our improvement are designated by suitable reference characters in each of the views, and in which—

Figure 2:
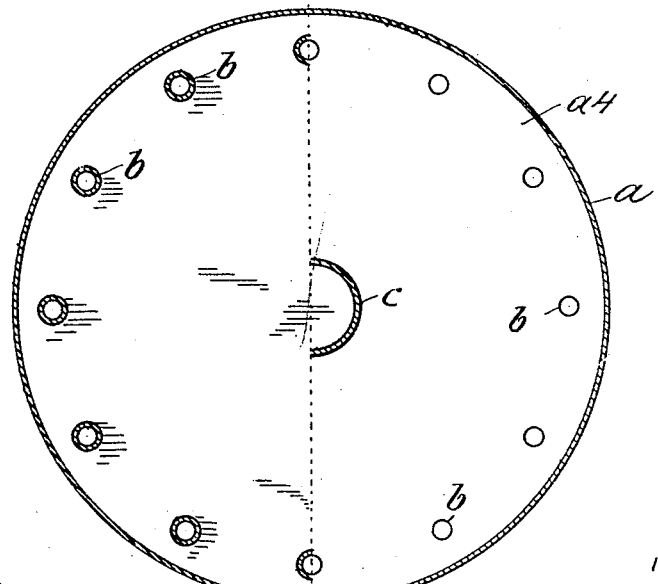

Figure 1 is a central vertical section of a water heating or boiling kettle made according to our invention, and Fig. 2 a section on the line 2 2 of Fig. 1.

In the practice of our invention we provide a kettle $a$, made of any suitable metal, and comprising a bottom chamber $a^2$ and a top chamber $a^3$, separated by a horizontal partition $a^4$.

The bottom chamber $a^2$ is provided with vertically-arranged tubes or flues $b$, which extend through the bottom of the chamber $a^2$ and through the partition $a^4$ into the chamber $a^3$, and said chamber $a^3$ is formed in the construction shown by means of the partition $a^4$ and the top $a^5$ of the kettle.

The top $a^5$ of the kettle and the partition $a^4$ are connected centrally by a vertically-arranged tube or casing $c$, the upper end of which is closed by a cap $d$, provided with a depending tubular member $d^2$, which fits in the tube or casing $c$ and a flange $d^3$, and said cap $d$ is also provided with a handle $d^4$.

The tube or casing $c$ forms an opening through which the kettle may be filled, and the top portion or cover $a^5$ of the kettle is also provided with a vent-opening $e$ for the escape of the waste heat, and the cap $d$ may also be provided with an opening $d^5$ to serve as a steam-vent.

The kettle $a$ is provided with a handle $f$, which is secured to the top $a^5$ thereof, and said kettle is also provided at one side with a spout $g$.

The tubes or flues $b$ in the form of construction shown are arranged in a circle in the bottom portion of the kettle; but said tubes or flues may be arranged in any desired manner, and any preferred number thereof may be employed.

In practice the kettle is filled or partially filled with water to be heated and placed on a stove or heater or over a fire, and the heat or hot gases pass up through the tubes or flues $b$ into the chamber $a^3$, and the waste or surplus heat passes over through the vent-opening $e$, and a number of said openings may be provided, if desired. In this way the water may be quickly heated, and it will be understood that other substances, such as milk or other material, may be heated in the same manner by means of our improved water-heating device or kettle.

It will also be understood that the kettle, or the separate parts thereof, may be made of any desired dimensions, and said kettle may be of any preferred shape or form.

It will also be understood that the top $a^5$ of the kettle is secured to the bottom thereof, and this may be done in any desired manner.

Having fully described our invention, what we claim as new, and desire to secure by Letters Patent, is—

1. A kettle provided with a bottom chamber and a top chamber and a permanent cover, the said chambers being separated by a horizontal partition, the top chamber being provided centrally with a tube which extends therethrough and into the bottom chamber and through the top of the top chamber, the bottom chamber being provided with flues which extend therethrough and into the top chamber, and the bottom chamber being also provided with a discharge-spout.

2. A kettle provided with a bottom chamber and a top chamber, said kettle being provided with a permanent cover, and the said chambers being separated by a horizontal partition, the top chamber being provided centrally with a tube which extends therethrough and into the bottom chamber and through the top of the top chamber and is provided with a closing-cap having a vent, the bottom chamber being provided with flues which extend therethrough and into the top chamber, the bottom chamber being also
5 provided with a discharge-spout and the top chamber with a vent, and the top of the kettle being provided with a handle.

In testimony that we claim the foregoing as our invention we have signed our names, in the presence of the subscribing witnesses, this 8th day of August, 1906.

HENRY APPLEBY.
ALFRED ARCHER GARDNER.

Witnesses:
FREDK. L. RAND,
A. NUTTING.